C. G. OVERMYER.
FLY TRAP.
APPLICATION FILED FEB. 8, 1913.
1,085,388.
Patented Jan. 27, 1914.
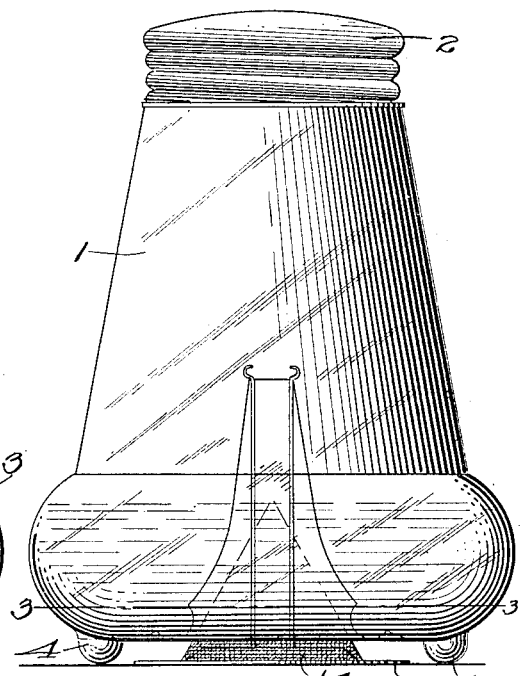
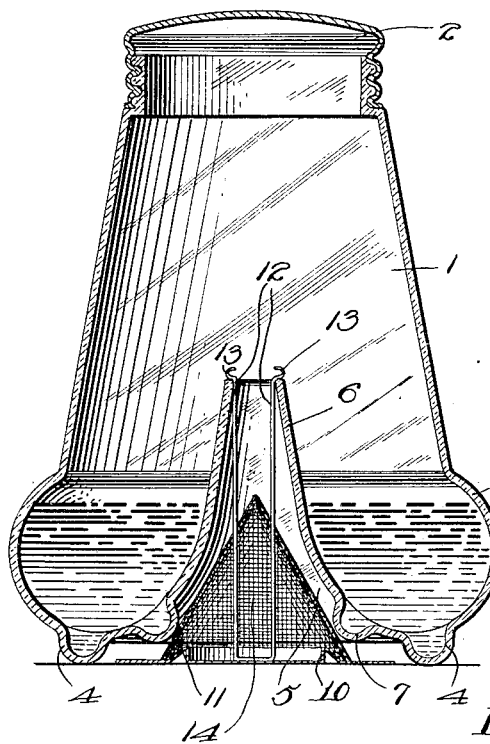
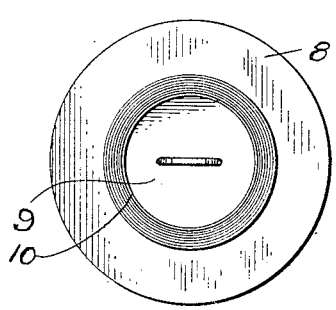
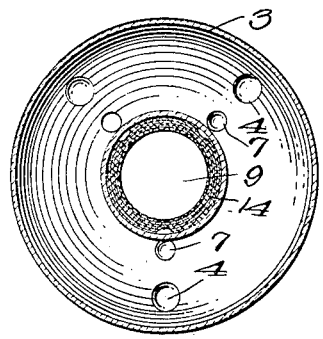
WITNESSES:
INVENTOR
Charles G. Overmyer
By E. E. Vrooman, HIS ATTORNEY.

UNITED STATES PATENT OFFICE.

CHARLES G. OVERMYER, OF HARTFORD CITY, INDIANA.

FLY-TRAP.

1,085,388. Specification of Letters Patent. Patented Jan. 27, 1914.

Application filed February 8, 1913. Serial No. 747,175.

*To all whom it may concern:*

Be it known that I, CHARLES G. OVERMYER, a citizen of the United States, residing at 624 West Kickapoo street, Hartford City, in the county of Blackford and State of Indiana, have invented certain new and useful Improvements in Fly-Traps, of which the following is a specification, reference being had therein to the accompanying drawing.

This invention relates to fly traps and has for its object the production of an entrance opening which is adapted to allow the flies to enter into the trap but will prevent them from flying out.

Another object of this invention is the production of a bait carrying member which is adapted to attract the flies to the entrance opening.

With these and other objects in view, this invention consists of certain novel combinations, constructions and arrangement of parts and will be hereinafter fully described and claimed.

In the accompanying drawing: Figure 1 is a side elevation of the trap. Fig. 2 is a central vertical section of the same. Fig. 3 is a section taken on the line 3—3 of Fig. 1. Fig. 4 is a top plan view of the bait carrying member.

Referring to the accompanying drawing by numerals, it will be seen that the trap comprises a hollow elongated body 1 which is provided at its upper portion with a threaded cap 2 whereby when it is desired to empty the trap the cap may be removed for allowing the contents to be emptied. The lower portion of the body 1 is provided with an enlarged bowl 3 upon which is formed the supporting knobs 4 for holding the trap at a spaced distance from the support. This bowl 3 is provided with a central opening 5 comprising an upstanding elongated neck 6. This bowl is also provided with a plurality of secondary knobs 7 for a purpose to be hereinafter described. It will be seen that a quantity of water may be placed in the trap as illustrated in Figs. 1 and 2. When the fly enters the opening 5 and flies up into the interior of the trap, it will in the course of a short time fall into the water contained in the trap. The bait carrying member comprises a plate 8 having a containing portion 9. The containing plate is provided with a vertical flange 10 and an incline portion 11. The portion 9 is provided with a pair of upwardly extending spring arms 12 which terminate in the hook portions 13. Slidably mounted upon these arms 12 there is a conical hood 14 which is formed of ordinary screen wire and comprises a guard for the containing portion 9. By means of this hood 14 the flies will be prevented from access to the containing portion 9 and will crawl around the hood until they fly up through the neck 6 into the interior of the trap.

When it is desired to use the device, the cap 2 is removed at which time the water may be poured into the trap. The bait carrying portion may be removed from engagement with the neck by pulling down upon the plate 8 whereby the spring arms 12 will be compressed and the hooks will become disengaged relative to the upper portion of the neck 6. After this bait carrying member has been removed the hood 14 may be moved upwardly upon the arms 12 whereby the bait may be placed within the containing portion 9 and by this time the hood may be released. It will then fall back into place and the incline portion 11 will constitute a guiding means for the lower portion of the hood and it will also constitute a means for preventing the hood from wabbling. The arms 12 are again passed up into the neck 6 and will engage the upper portion thereof, whereby the trap may be carried from place to place without danger of the bait carrying member becoming disengaged from the trap. The secondary lug 7 will bear upon the sides of the hood member 14 and will constitute a means for preventing the hood and plate from swinging to and fro as the trap is being moved. In this manner it will be seen that the bait carrying member will be held in its correct position and in such a manner as to allow the flies to enter into the trap.

Having thus described the invention, what is claimed as new, is:—

1. A fly-trap comprising a body provided with an inwardly extending neck formed at its lower portion, a bait containing plate positioned beneath said neck, vertically extending spring arms carried by said plate, a flange formed upon said plate for holding the bait in its correct position, a wire hood slidably mounted upon said spring arms and adapted to fit over said flange, whereby flies will be prevented from having access to the bait carried by said plate, said hood extending up into said neck for guiding the flies into the trap, said hood adapted to slide up said arms whereby bait may be placed upon said plate and said arms adapted to hold said plate and hook in engagement with said body.

2. A fly-trap comprising a body provided with an inwardly extending neck at its lower portion, spacing knobs formed upon said neck, a plate provided with a bait containing portion positioned beneath said neck, vertically extending parallel spring arms attached to said plate, a conical wire hood slidably mounted upon said spring arms and adapted to fit over the bait containing portion, said wire hood fitting up in said neck and said spacing knobs bearing upon said hood for holding said plate in a central position under said neck, said arms engaging said neck for holding the hood and plate in position, said hood adapted to slide upon said spring arms for allowing bait to be placed on said plate.

In testimony whereof I hereunto affix my signature in presence of two witnesses.

CHARLES G. OVERMYER.

Witnesses:
EWIN C. BAUER,
EDWIN OVERMYER.

---

Copies of this patent may be obtained for five cents each, by addressing the "Commissioner of Patents, Washington, D. C."